(No Model.)

S. A. EISELE.
NUT LOCK.

No. 570,917. Patented Nov. 10, 1896.

WITNESSES:
Fred G. Dieterich
M. D. Blondel

INVENTOR
Stephen A. Eisele.
BY Munn & Co
ATTORNEYS.

UNITED STATES PATENT OFFICE.

STEPHEN A. EISELE, OF SAN ANTONIO, FLORIDA.

NUT-LOCK.

SPECIFICATION forming part of Letters Patent No. 570,917, dated November 10, 1896.

Application filed October 31, 1895. Serial No. 567,549. (No model.)

*To all whom it may concern:*

Be it known that I, STEPHEN A. EISELE, of San Antonio, in the county of Pasco and State of Florida, have invented a new and useful Improvement in Nut-Locks, of which the following is a specification.

My invention is an improvement in nut-locks; and it consists in the constructions, combinations, and arrangements of parts, as will be hereinafter described, and pointed out in the claims.

Figure 1:
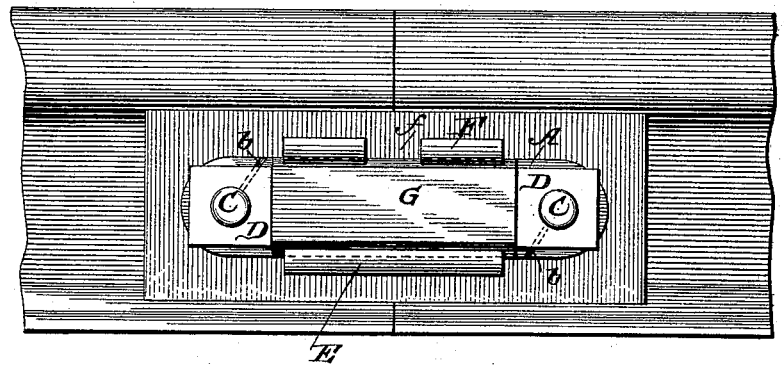
Figure 2:
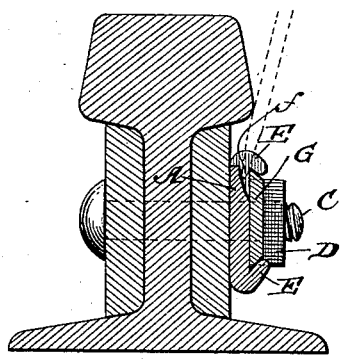
Figure 3:
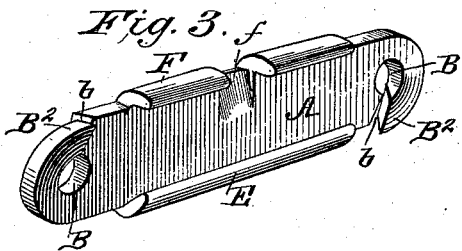
Figure 4:
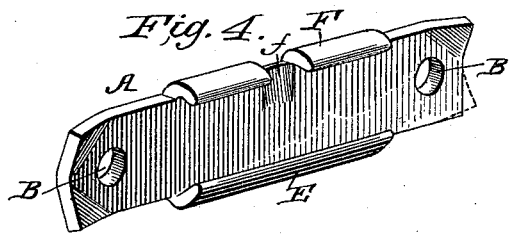

In the drawings, Figure 1 is a face view, and Fig. 2 is a cross-section, of my invention as in use, Fig. 2 showing in dotted lines the manner of releasing the lock-plate. Fig. 3 is a detail view of the clasp-plate, and Fig. 4 shows a somewhat different construction of spring-tongue.

The clasp-plate A is provided near its ends with bolt-openings B, through which the bolts C pass, and the said clasp-plate is held in position by the nuts D, turned on the bolts C and bearing against the said clasp-plate, as will be understood from Figs. 1 and 2.

Slits $b$ lead from the edge of the clasp-plate inward into the openings B, and the tongue $B^2$ so formed is deflected or bent upward and operates as a spring-tongue to take up the slack and keep the nut tight at all times. While the tongue is preferably formed as shown most clearly in Fig. 3, it may be secured as shown in Fig. 4, bending up or deflecting one or more of the corners of the plate to act as a spring against the under side of the nut. Between these bolt-openings B, I provide the clasp-plate at one side or edge, usually the lower, as shown, with a longitudinally-extended seat E for one edge of the lock-plate, presently described. This seat is formed by a rib or bead produced upon the plate and having its seat-face undercut, as shown. Opposite this seat E, and preferably parallel therewith as shown, I form the retaining portion F, which in Figs. 1, 2, and 3 is a spring-like portion, into engagement with which the edge of the lock-plate may be sprung by a tap of a hammer. This lock-plate G bears at its ends against the side of the nuts D, and when held in the seat and spring portions, as shown in Figs. 1 and 2, locks said nuts positively from turning. To permit the convenient unlocking of the nut, I provide the spring portion F between its ends with a notch or opening $f$, through which a chisel, punch, or similar instrument may be passed into engagement with the locking-plate to force the same out of the clasp-plate and free it from the nuts.

Having thus described my invention, what I claim, and desire to secure by Letters Patent, is—

1. The combination with the nuts to be locked and the separated bolts on which said nuts are turned of the clasp-plate having openings fitted on said bolts and held beneath the nuts and provided between the said nuts with a longitudinal seat and opposite the same with a spring retaining portion having an opening or notch between its ends and the lock-plate fitted at one edge to the seat, sprung at its other edge into engagement with the spring portion and bearing at its ends against the nuts to be locked substantially as and for the purposes set forth.

2. The nut-lock herein described consisting of the clasp-plate having near its ends openings for the bolts and having slits leading from the said openings to the edge of the plate forming tongues which are deflected substantially as described, such clasp-plate having at one side a seat for one edge of the locking-plate and at the opposite side or edge a spring portion and the locking-plate fitted at one edge to the seat of the clasp-plate and having its other edge sprung into engagement with the spring portion of the clasp-plate all substantially as and for the purposes set forth.

STEPHEN A. EISELE.

Witnesses:
JOHN S. FLANAGAN,
K. H. FLANAGAN.